US012657346B2

(12) United States Patent
Dorman et al.

(10) Patent No.: US 12,657,346 B2
(45) Date of Patent: Jun. 16, 2026

(54) COMPRESSED DATA INTEGRITY VERITIFICATION USING DATA INTEGRITY FIELD

(71) Applicant: Dell Products, L.P., Hopkinton, MA (US)

(72) Inventors: Kenneth Dorman, West Brookfield, MA (US); Lixin Pang, Needham, MA (US); Rong Yu, West Roxbury, MA (US); Jeremy O'Hare, Westborough, MA (US); James Guyer, Northboro, MA (US); Jason Duquette, Sturbridge, MA (US)

(73) Assignee: Dell Products, L.P., Hopkinton, MA (US)

( * ) Notice: Subject to any disclaimer, the term of this patent is extended or adjusted under 35 U.S.C. 154(b) by 250 days.

(21) Appl. No.: 18/368,156

(22) Filed: Sep. 14, 2023

(65) Prior Publication Data

US 2025/0094640 A1      Mar. 20, 2025

(51) Int. Cl.
*G06F 21/64* (2013.01)
*G06F 11/10* (2006.01)

(52) U.S. Cl.
CPC .......... *G06F 21/64* (2013.01); *G06F 11/1004* (2013.01)

(58) Field of Classification Search
CPC .............................. G06F 21/64; G06F 11/1004
See application file for complete search history.

(56) References Cited

U.S. PATENT DOCUMENTS

| | | | | |
|---|---|---|---|---|
| 2013/0226887 A1* | 8/2013 | Braam | .................. | G06F 16/183 |
| | | | | 707/697 |
| 2018/0095682 A1* | 4/2018 | Agombar | ............ | G06F 12/0811 |
| 2018/0152201 A1* | 5/2018 | Gopal | ................ | H03K 19/1731 |
| 2020/0293196 A1* | 9/2020 | Tamma | ............... | G06F 11/1004 |

FOREIGN PATENT DOCUMENTS

| | | | | |
|---|---|---|---|---|
| WO | WO-2022041906 A1 * | 3/2022 | .......... | H03M 7/3064 |

* cited by examiner

*Primary Examiner* — Linglan Edwards
*Assistant Examiner* — Saron Matthewos Worku
(74) *Attorney, Agent, or Firm* — Anderson Gorecki LLP

(57) ABSTRACT

Data Integrity Field (DIF) is used to implement compression verification. When a write IO operation is received, the write IO operation is divided into data blocks, and a respective DIF is created and appended to each data block. When the write IO is compressed, the data blocks and respective DIF are collectively compressed to form compressed data. The compressed data is divided into compressed data blocks, and a respective second DIF is created and appended to each respective data block of compressed data. To verify that the compressed data is able to be decompressed, a copy of the compressed data is decompressed to restore the original data blocks and respective DIF. Each respective DIF is used to verify the content of its respective data block. In response to a determination that respective DIF match the respective data blocks, the decompression process is deemed to be verified.

16 Claims, 5 Drawing Sheets

COMPRESSED DATA INTEGRITY VERITIFICATION USING DATA INTEGRITY FIELD

FIELD

This disclosure relates to computing systems and related devices and methods, and, more particularly, to a method and apparatus for enabling compressed data integrity verification of a write IO operation using data integrity field.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, Data Integrity Field (DIF) is used to implement compression verification. When a write IO operation is received, the write IO operation is divided into data blocks, and a respective DIF is created and appended to each data block. The data blocks/DIF #1 of the write IO are then stored in a first storage. When the write IO is compressed, the data blocks and respective DIF are collectively compressed to form compressed data. The compressed data is divided into compressed data blocks, and a respective second DIF is created and appended to each respective data block of compressed data.

To verify that the compressed data is able to be decompressed, in some embodiments a copy of the compressed data is decompressed to restore the original data blocks and respective DIF. Each respective DIF is used to verify the content of its respective data block. In response to a determination that respective DIF match the respective data blocks, the decompression process is deemed to be verified and the compressed data is stored in storage resources. In response to a determination that at least one DIF does not match its respective data block, the decompression process is deemed to not be verified. In some embodiments, in response to a determination that DIF is not able to be used to verify the compression process, a byte-by-byte comparison process is used to compare the decompressed version of the compressed data with the original data.

In some embodiments, a method of compressed data integrity verification includes receiving a write IO containing uncompressed data, dividing the uncompressed data into a set of uncompressed data blocks, adding a respective first Data Integrity Field (DIF) to each respective uncompressed data block of the set of uncompressed data blocks, and compressing the set of uncompressed data blocks and respective first DIF to create compressed data. The method also includes dividing the compressed data into a set of compressed data blocks, adding a respective second DIF to each respective compressed data block of the set of compressed data blocks. The method also includes verifying the compressed data is able to be accurately decompressed to recreate the uncompressed data, by decompressing the compressed data to create a set of decompressed data blocks and respective decompressed first DIF, and using the respective decompressed first DIF to verify the decompressed data contained in each of the decompressed data blocks.

In some embodiments, compressing the set of data blocks and respective first DIF includes collectively compressing the set of data blocks and respective first DIF to form the compressed data.

In some embodiments, each uncompressed data block has a size of 512 bytes, each respective first DIF has a size of 8 bytes, each compressed data block has a size of 512 bytes, and each respective second DIF has a size of 8 bytes. In some embodiments, each respective first DIF includes a respective first Cyclic Redundancy Check (CRC) calculated on a respective 512-byte uncompressed data block, and each respective second DIF includes a respective second CRC calculated on a respective 512-byte compressed data block. In some embodiments, using the respective decompressed first DIF to verify the decompressed data contained in each of the decompressed data blocks includes, for each decompressed data block, calculating a third respective CRC on the data contained in the decompressed data block and comparing the third respective CRC with the CRC of the respective first DIF.

In some embodiments, the method further includes, in response to a determination that the compressed data is able to be accurately decompressed to recreate the uncompressed data, forwarding the compressed data blocks and respective second DIF to storage.

In some embodiments, the method further includes, in response to a determination that the compressed data is not able to be accurately decompressed to recreate the uncompressed data, implementing a byte-by-byte comparison process to implement compression verification.

In some embodiments, the byte-by-byte comparison process includes comparing each byte of the decompressed data with each byte of the uncompressed data received in the write IO.

In some embodiments, compressing the set of uncompressed data blocks and respective first DIF to create the compressed data, dividing the compressed data into the set of compressed data blocks, adding the respective second DIF to each respective compressed data block, and verifying the compressed data is able to be accurately decompressed to recreate the uncompressed data, is all implemented in DIF-enabled compression/decompression hardware.

In some embodiments, a system for compressed data integrity verification includes one or more processors and one or more storage devices storing instructions that are operable, when executed by the one or more processors, to cause the one or more processors to perform operations. In some embodiments, the operations include receiving a write IO containing uncompressed data, dividing the uncompressed data into a set of uncompressed data blocks, adding a respective first Data Integrity Field (DIF) to each respective uncompressed data block of the set of uncompressed data blocks, and compressing the set of uncompressed data blocks and respective first DIF to create compressed data. In some embodiments, the operations further include dividing the compressed data into a set of compressed data blocks, and adding a respective second DIF to each respective compressed data block of the set of compressed data blocks. In some embodiments, the operations further include verifying the compressed data is able to be accurately decompressed to recreate the uncompressed data, by decompressing the compressed data to create a set of decompressed data blocks and respective decompressed first DIF, and using the respective decompressed first DIF to verify the decompressed data contained in each of the decompressed data blocks.

In some embodiments, compressing the set of data blocks and respective first DIF includes collectively compressing the set of data blocks and respective first DIF to form the compressed data.

In some embodiments, each uncompressed data block has a size of 512 bytes, each respective first DIF has a size of 8 bytes, each compressed data block has a size of 512 bytes, and each respective second DIF has a size of 8 bytes. In some embodiments, each respective first DIF includes a respective first Cyclic Redundancy Check (CRC) calculated on a respective 512-byte uncompressed data block, and each respective second DIF includes a respective second CRC calculated on a respective 512-byte compressed data block. In some embodiments, using the respective decompressed first DIF to verify the decompressed data contained in each of the decompressed data blocks includes, for each decompressed data block, calculating a third respective CRC on the data contained in the decompressed data block and comparing the third respective CRC with the CRC of the respective first DIF.

In some embodiments the operations further include, in response to a determination that the compressed data is able to be accurately decompressed to recreate the uncompressed data, forwarding the compressed data blocks and respective second DIF to storage.

In some embodiments the operations further include, in response to a determination that the compressed data is not able to be accurately decompressed to recreate the uncompressed data, implementing a byte-by-byte comparison process to implement compression verification. In some embodiments, the byte-by-byte comparison process includes comparing each byte of the decompressed data with each byte of the uncompressed data received in the write IO.

In some embodiments, at least some of the processors are included in Data Integrity Field (DIF) enabled compression/decompression hardware, and the operations of compressing the set of uncompressed data blocks and respective first DIF to create the compressed data, dividing the compressed data into the set of compressed data blocks, adding the respective second DIF to each respective compressed data block, and verifying the compressed data is able to be accurately decompressed to recreate the uncompressed data, are all implemented in the DIF-enabled compression/decompression hardware.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
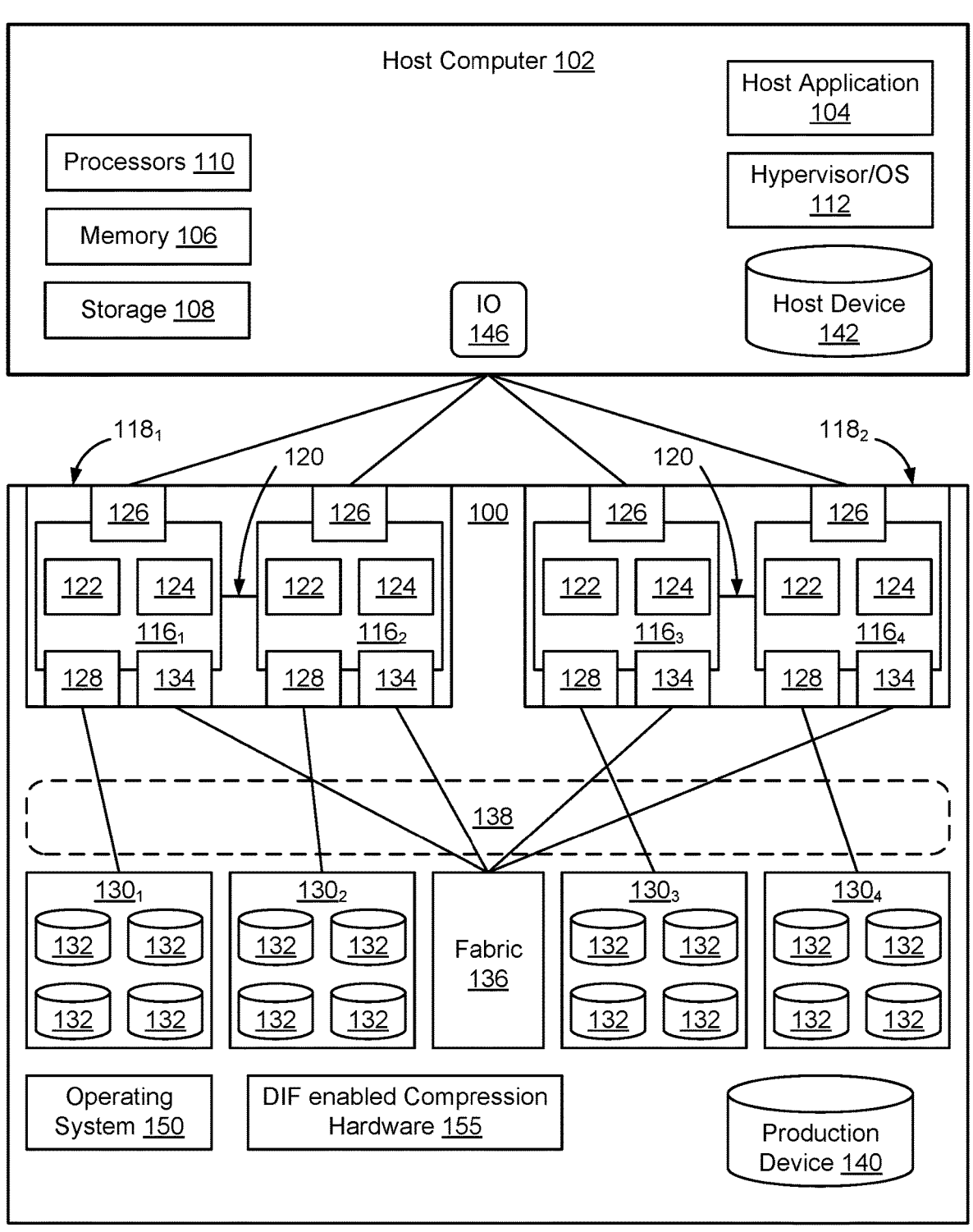
FIG. 1 is a functional block diagram of a host computer connected to an example storage system having DIF enabled compression hardware, according to some embodiments.

FIG. 1 is a functional block diagram of a host computer connected to an example storage system having DIF enabled compression hardware, according to some embodiments. FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes 116₁-116₄, possibly including but not limited to storage servers and specially designed compute engines or storage directors for providing data storage services. In some embodiments, pairs of the compute nodes, e.g. (116₁-116₂) and (116₃-116₄), are organized as storage engines 118₁ and 118₂, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines 118₁ and 118₂, which has a pair of (two independent) compute nodes, e.g. (116₁-116₂) or (116₃-116₄). A given storage engine 118 is implemented using a single physical enclosure and provides a logical separation between itself and other storage engines 118 of the storage system 100. A given storage system 100 may include one storage engine 118 or multiple storage engines 118.

Each compute node, 116₁, 116₂, 116₃, 116₄, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node 116₁-116₄ may also include one or more back-end adapters 128 for communicating with respective associated back-end drive arrays 130₁-130₄, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes 116₁-116₄, using a PCIe (Peripheral Component Interconnect Express) bus or may be connected to the compute nodes 116₁-116₄, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications

104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes 116₁-116₄ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes 116₁-116₄. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As shown in FIG. 1, in some embodiments the storage system 100 includes DIF enabled compression hardware 155. Data compression reduces disk usage, while allowing more user data to be saved in a smaller amount of disk space. However, compression can have several problems. For example, some compression methods may result in loss of data, because original information can be lost during the compression process. Further, there is a risk of data corruption. Specifically, compressed data can be more vulnerable to corruption than uncompressed data, which can result in the corrupted data not being able to be decompressed thus causing data loss. To prevent data from being lost during the compression process, it is possible to decompress a copy of the compressed data and implement a byte-by-byte comparison between the original data and the decompressed copy of the compressed data. If the two copies match using the byte-by-byte comparison process, the compressed data has been verified. However, implementing this compression, decompression, and byte-by-byte comparison process can cause excessive CPU usage, can affect system performance, and can increase the overall system complexity and maintenance costs.

According to some embodiments, Data Integrity Field is used to implement compressed data integrity verification. Data Integrity Field (DIF) is a feature of Small Computer System Interface (SCSI) based storage systems that is used for error detection and correction. It allows the storage device to verify the data as it is being written or read. Specifically, DIF was proposed in 2003 and included extending the disk sector from its traditional size of 512 bytes to 520 bytes, by adding an additional eight protection bytes to the 512-byte data block. The 8-byte extension used by DIF to implement verification of IO operations includes a GUARD Tag (two bytes) which includes a Cyclic Redundancy Check (CRC) calculated on the 512-byte data block, an application identifier (two bytes) that identifies the application associated with the IO operation, and a reference tag (four bytes) that is used to check misdirected write operations. The DIF data is computed and interleaved along with the 512-byte data block. The DIF data can then be used, at a later point, to verify the integrity of the data contained in the data block. For example, a CRC can be calculated from the data that is currently contained in the data block, and the calculated CRC can be compared to the CRC of the DIF, to ensure that the data that is currently contained in the data block is the same as the data that was contained in the data block when the DIF was added to the data block. This enables changes to data over time to be detected, thus protecting the data from corruption.

Figure 2:
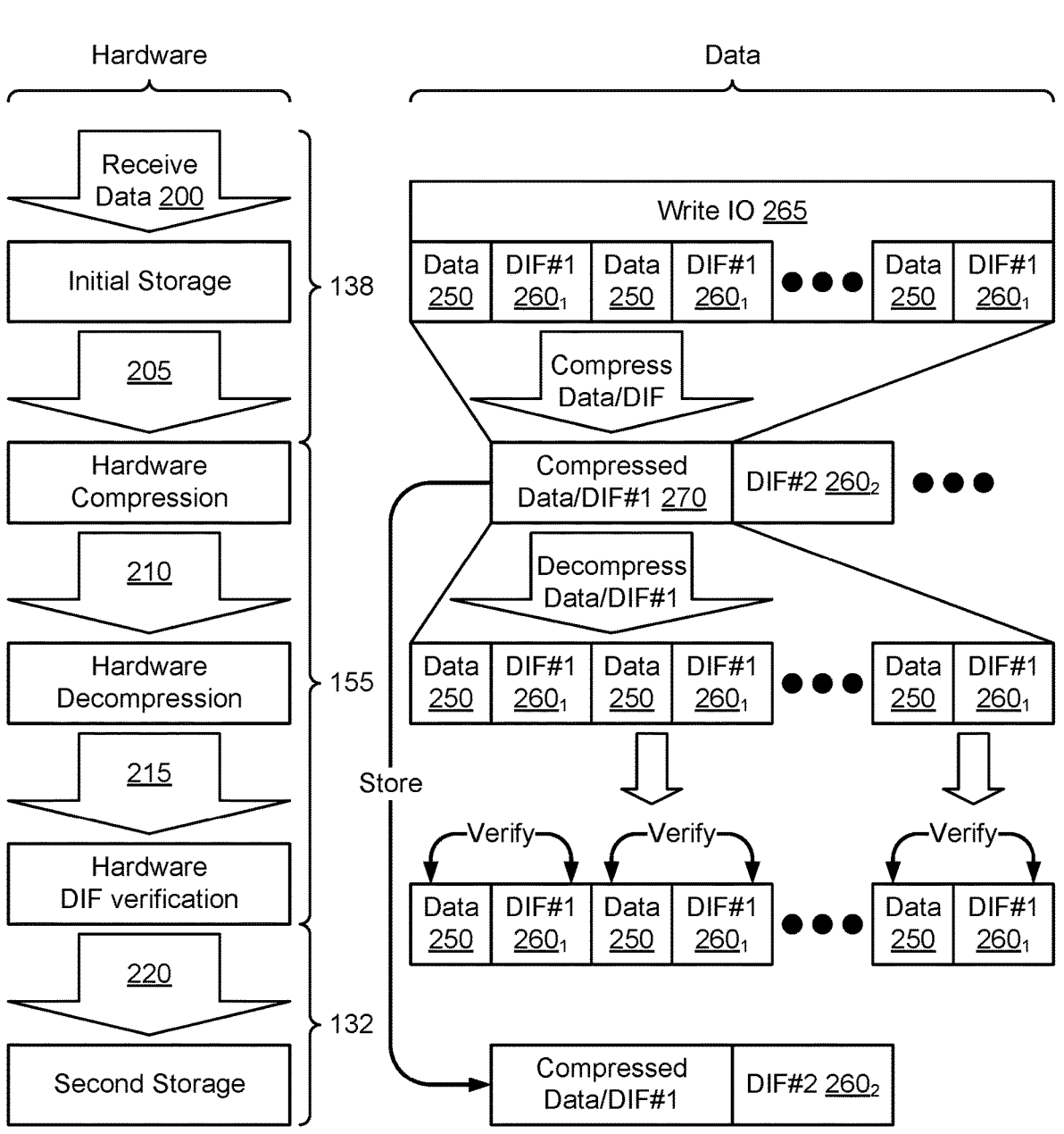
FIG. 2 is a block diagram of an example way of utilizing DIF enabled compression hardware to perform compressed data integrity verification on a write IO operation using DIF, according to some embodiments.

FIG. 2 is a block diagram of an example way of utilizing DIF enabled compression hardware 155 to perform compressed data integrity verification on a write IO operation, according to some embodiments. As shown in FIG. 2, according to some embodiments, when a write IO is received (arrow 200), for example in connection with a write IO operation from a host 102, the write IO is broken into a plurality of data blocks 250, and a CRC is calculated on each received data block 250 and appended to the block of data 250 in the form of a DIF $260_1$. For example, if a write IO is on the order of 128 kb in size, and each data block has a size of 512 bytes, the write IO might have on the order of 250 data blocks. The set of interleaved blocks of data 250 and respective DIF $260_1$ are then stored in a slot of an initial storage medium on the storage system. An example initial storage might be, for example as shown in FIG. 1, a slot of shared global memory 138.

In response to a determination that the write IO contains data that should be compressed prior to being stored in the back-end storage resources 132, the set of blocks of data 250 and each respective DIF $260_1$ are passed to a DIF-enabled hardware compression engine 155, and the set of blocks of data 250 and respective DIF #1 $260_1$ are compressed by the hardware compression engine 155 to form compressed data. The compressed data is formed into compressed data blocks 270, and the DIF-enabled hardware compression engine 155 calculates a respective second CRC from each compressed data block 270, that is used to create and append a second DIF #2 $260_2$ to each respective compressed data block 270.

The DIF-enabled hardware compression engine 155, in some embodiments, is also configured to implement compression verification by decompressing a copy of the compressed data using hardware decompression. Decompression of the compressed data restores each of the original data blocks 250 and its respective DIF #1 $260_1$. Accordingly, each respective DIF #1 is able to be used to verify the content of each respective data block 250 of the write IO 265. If a CRC computed from the decompressed original data block 250 matches the CRC contained in its respective DIF #1 $260_1$, the compression process accurately compressed the data in a manner that will enable the data to be decompressed without data loss at a later point in time. Accordingly, once the compression has been verified, the compressed data blocks 270 with the respective DIF #2 are passed to the second storage and the compressed write IO is stored in the second storage. An example second storage might be, for example as shown in FIG. 1, managed drives 132.

By offloading compression and compression verification to dedicated DIF-enabled compression hardware 155, it is possible to reduce system complexity and reduce CPU usage, while providing better protection against data loss that could otherwise occur in connection with data corruption. Further, use of DIF-enabled compression hardware 155 reduces the complexity of existing compression write framework. Additionally, by ensuring that a CRC is always present with data, both when compressed and prior to being compressed, data blocks are not exposed to data corruption since the data blocks never exist in a state without an attached DIF/CRC.

Figure 3:
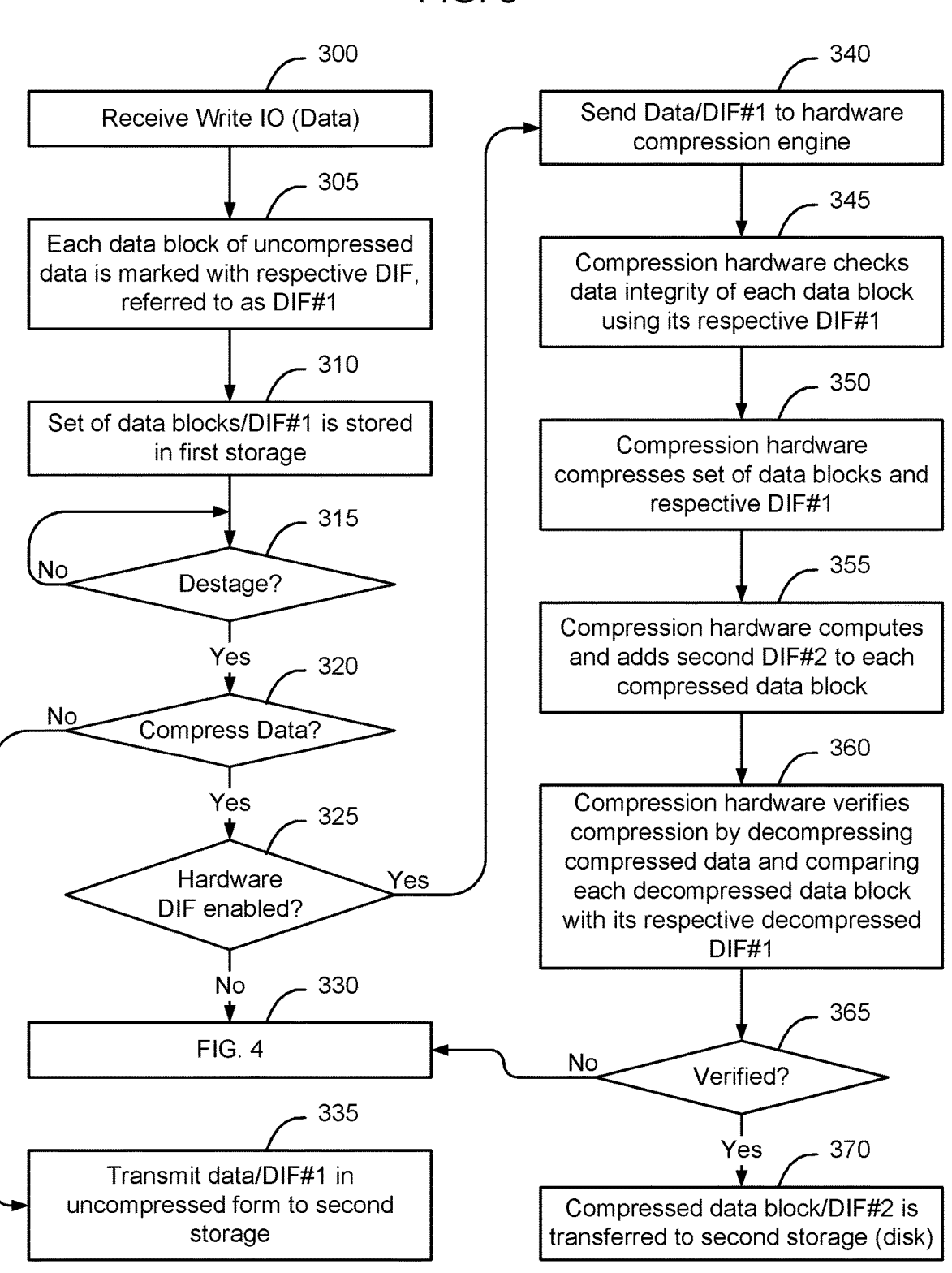
FIGS. 3 and 4 are a flowchart of an example process of compressed data integrity verification using DIF in connection with a compressed write IO operation, according to some embodiments.
Figure 4:
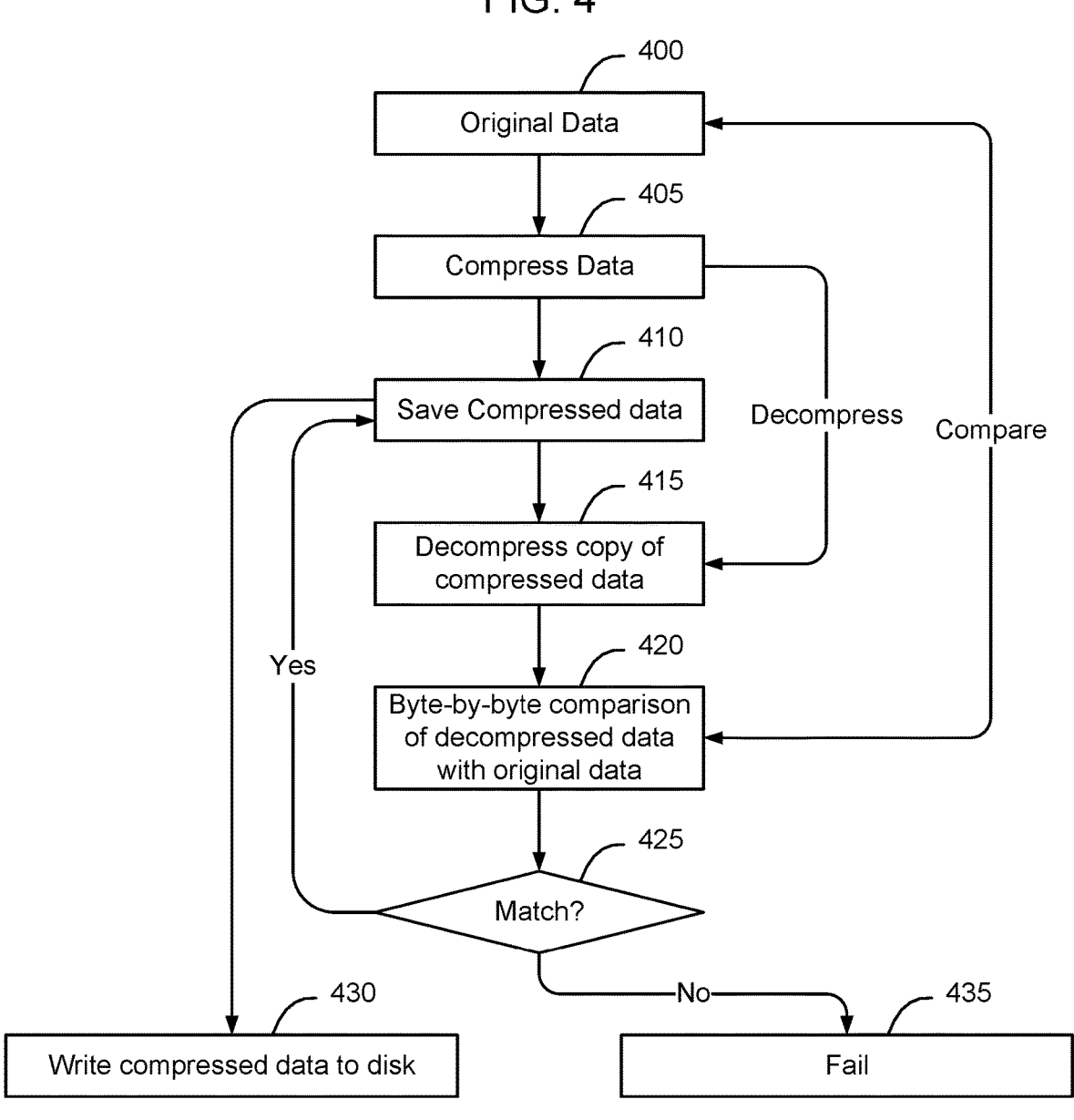

FIGS. 3 and 4 are a flowchart of an example process of compressed data integrity verification in connection with a compressed write operation, according to some embodiments. As shown in FIG. 3, when a write IO operation is received, for example from a host 102, (block 300), the write IO operation is divided into a plurality of 512-byte data blocks, and each block of uncompressed data is marked with a T10 Data Integrity Field (DIF) (block 305). The data blocks and respective DIF #1 of the write IO are stored in a first storage (block 310) on the storage system 100.

A determination is then made as to whether to destage the data from global memory 138 to back-end storage resources (block 315). Destaging data involves moving the data from a first memory, such as an allocated slot of global memory 138, to a second memory, such as a designated track of one of the managed drives 132 of storage array 130. While a decision is not implemented to destage the data (a determination of NO at block 315), the data is maintained in the first memory in uncompressed format. When a decision is implemented to destage the data (a determination of YES at block 315), a destage task is initiated on the storage system 100.

In some embodiments, as part of the destage task, a determination is made as to whether the data should be compressed in connection with being moved to the second storage (block 320). For example, in some embodiments, activity-based compression is used to select a portion of tracks of data to be stored in the second storage in uncompressed form. For example, in some embodiments the most frequently accessed 20% (or some other percentage) of tracks are maintained in uncompressed form to accelerate responding to accesses to those frequently used addresses. Accordingly, in some embodiments, a determination is made as to whether the write IO should be compressed prior to being stored in the second storage (block 320). In response to a determination that the write IO should not be compressed (a determination of NO at block 320), the data blocks and respective DIF #1 of the write IO are transmitted in uncompressed form to the second storage (block 335).

In some embodiments, in response to a determination that the data should be compressed in connection with being destaged (a determination of YES at block 320), a determination is also implemented as to whether the storage system includes DIF enabled compression hardware 155 (block 325). As used herein, the term "DIF enabled compression hardware" 155 is used to refer to computer hardware such as an Application Specific Integrated Circuit (ASIC) that is configured to both implement data compression, and to implement data compression verification using DIF. For example, as discussed in greater detail herein, in some embodiments the DIF enabled compression hardware 155 is configured to compress data blocks and the respective associated DIF #1 to form compressed data, and perform compression verification by decompressing the compressed data and using the restored DIF #1 to verify the content of each respective data block. In instances where the storage system does not include DIF enabled compression hardware 155, or where the DIF enabled compression hardware 155 is temporarily not available (a determination of NO at block 325), in some embodiments a byte-by-byte comparison process described in connection with FIG. 4 is used to implement compression verification (block 330).

In instances where the storage system includes DIF enabled compression hardware 155 (a determination of YES at block 325), the data blocks and respective DIF #1 of the write IO are sent to the DIF enabled compression hardware 155 (block 340). The DIF enabled compression hardware 155 checks the integrity of each received data block using its respective DIF #1 (block 345). In some embodiments, validating the received data blocks by the DIF enabled compression hardware 155 is implemented by causing the DIF enabled compression hardware 155 to calculate a CRC from the received 512-byte data block, and comparing the calculated CRC with the CRC contained in the GUARD tag of DIF #1 to determine if the calculated CRC matches the CRC from the GUARD tag. In response to a determination that the two CRC values match, the data block received by the DIF enabled compression hardware 155 was not corrupted in connection with transfer from the first storage to the hardware compression engine 155. If the two values do not match, in some embodiments the DIF enabled compression hardware 155 may generate an error.

As shown in FIG. 3, in some embodiments the DIF enabled compression hardware 155 compresses the 512-byte data blocks and respective DIF #1 to create compressed data (block 350). The compressed data is divided into 512-byte data blocks and a respective DIF #2 is appended to each respective data block of compressed data by the DIF enabled compression hardware 155 (block 355). The second DIF (DIF #2) enables the respective compressed data blocks to be verified by subsequent components, such as second memory, when the compressed data blocks/DIF #2 are transmitted between components of the storage system.

In some embodiments, as shown in FIG. 3, the DIF enabled compression hardware 155 is also configured to perform compression verification. Specifically, as discussed in greater detail herein, in some embodiments the DIF enabled compression hardware 155 stores the compressed data blocks and respective DIF #2, and decompresses a copy of the compressed data to extract the original data blocks 250 and each respective DIF #1 260₁. The DIF enabled compression hardware 155 then calculates a respective CRC from each decompressed data block 250, and compares the calculated CRC with the CRC contained in the GUARD tag of each respective decompressed DIF #1 260₁ to determine if the calculated CRC matches the CRC from the GUARD tag of DIF #1 (block 360). If the two CRC values match, the integrity of the compressed data has been verified (a determination of YES at block 365), and the compressed data blocks and respective DIF #2 containing the compressed data are transferred to the second storage (block 370). If the two CRC values do not match (a determination of NO at block 365), there was a problem with the compression such that the integrity of the compressed data is not able to be verified by the DIF enabled compression hardware. In some embodiments, if the compression integrity is not able to be verified by the DIF enabled compression hardware 155 (a determination of NO at block 365), the process described in connection with FIG. 4 is used to implement data compression integrity verification (block 330).

As shown in FIG. 4, it is possible to implement data compression integrity verification using a byte-by-byte comparison between the original uncompressed data and a decompressed version of the compressed data. In some embodiments the process implemented in FIG. 4 is implemented using software executing using CPU resources of the storage system 100.

For example, as shown in FIG. 4, in some embodiments the original data of the write IO is received (block 400) and a compression algorithm is executed to compress the data (block 405). Once the write IO data has been compressed, the compressed version of the data is saved (block 410). A copy of the compressed version of the data is then decompressed (block 415), and a byte-by-byte comparison of the decompressed data is implemented against the original data of the write IO (block 420) to determine if the decompressed data matches the original data (block 425). In instances where the decompressed data matches the original data (a determination of YES at block 425), the integrity of the saved copy of the compressed data has been verified, since it has been verified that it is possible to recreate the original data by decompressing the compressed data. Accordingly, saved copy of the compressed data is able to be written out to the second storage (block 430). In instances where the decompressed data does not match the original data of the write IO (a determination of NO at block 425), the compression integrity verification process determines that there was a problem with the compression process (block 435), because it is not possible to recreate the original data by decompressing the compressed version of the data.

By providing both a software-based method of implementing compression verification (FIG. 4) as well as a hardware-based method of implementing compression verification (FIGS. 2 and 3), it is possible to use the hardware-based method as a primary solution and incorporate the software-based method in instances where the hardware-based method is experiencing failure or is otherwise unavailable. Likewise, by providing a hardware-based method of implementing compression verification, it is possible to greatly simplify the process of compression verification, while removing the workload associated with compression verification from the CPU cores of the storage system. Further, using DIF to implement compression verification as described in FIG. 3, instead of byte-by-byte comparisons as described in FIG. 4, greatly reduces the complexity of the compression verification process and, by extension, greatly reduces the complexity of the destage control logic of the storage system.

Figure 5:
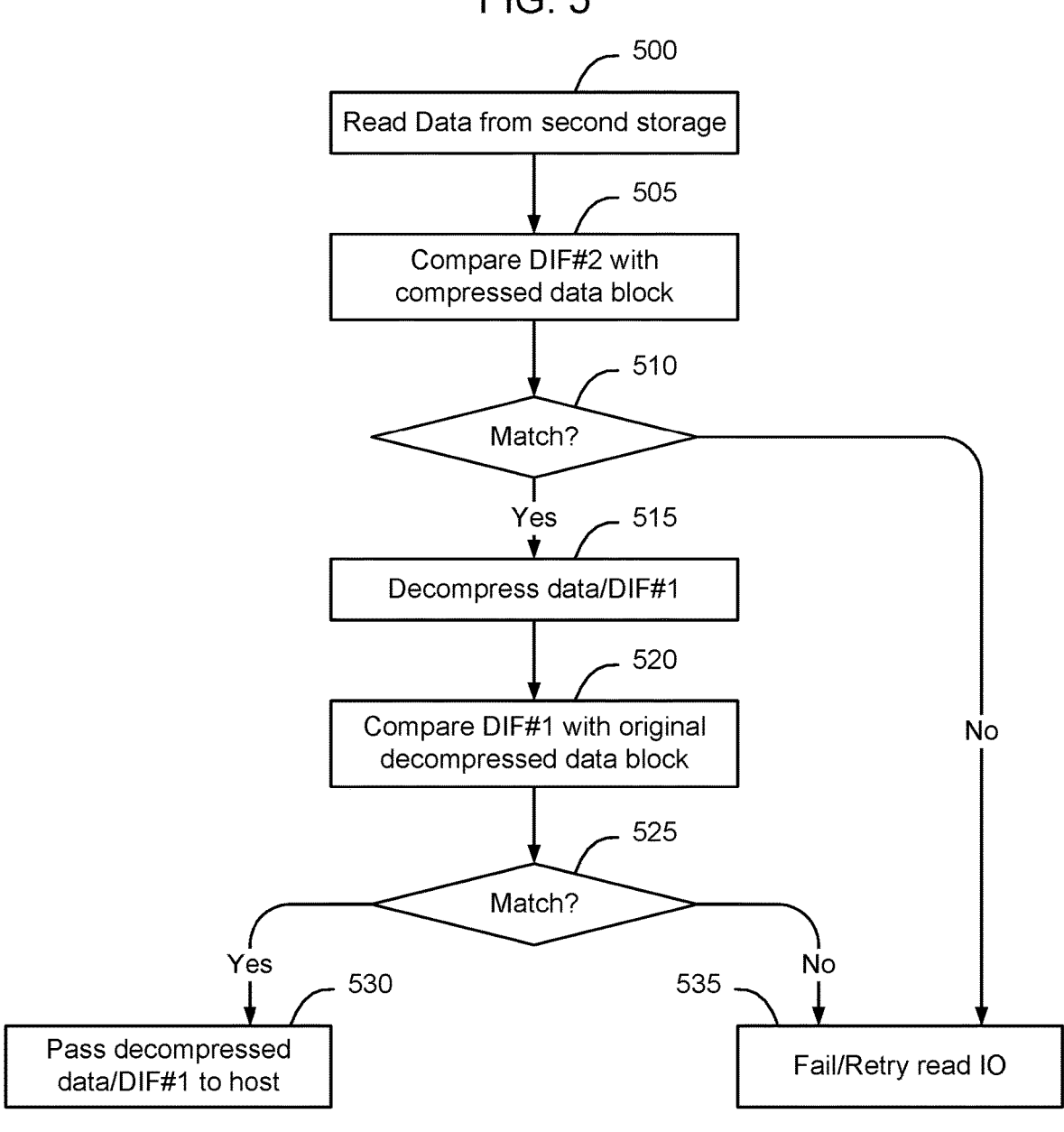
FIG. 5 is a flowchart of an example process of compressed data integrity verification using DIF in connection with a read IO operation on previously compressed data, according to some embodiments.

FIG. 5 is a flowchart of an example process of compressed data integrity verification in connection with a read operation on previously compressed data, according to some embodiments. As shown in FIG. 5, in some embodiments the DIF enabled compression hardware 155 is also used in connection with reading and decompressing previously compressed data. For example, as shown in FIG. 5, in response to a request to read a track of data that contains compressed data (block 500) the requested data blocks and respective DIF #2 are read from the selected track of second storage and provided to the DIF enabled compression hardware 155. The DIF enabled compression hardware 155 uses the DIF #2 to verify the respective data blocks. For example, in some embodiments the DIF enabled compression hardware 155 calculates a CRC from each respective data block of compressed data and compares the calculated CRC with the CRC contained in the GUARD tag of the respective DIF #2 for the data block (block 505). The DIF enabled compression hardware 155 then determines if the calculated CRC matches the CRC extracted from DIF #2 (block 510) to ensure that the data contained in the data block has not been changed.

In response to a determination that the calculated CRC does not match the CRC contained in DIF #2 (a determination of NO at block 510), the read fails (block 535). Optionally, the read IO may be retried. In response to a determination that the calculated CRC matches the CRC contained in DIF #2 (a determination of YES at block 510), the DIF enabled compression hardware 155 removes DIF #2 to recreate the compressed data, and decompresses the compressed data to recreate the original data blocks 250 and respective DIF #1.

The DIF enabled compression hardware 155 calculates a respective CRC from each decompressed data block and compares the calculated CRC with the respective CRC contained in the GUARD tag of the respective DIF #1 (block 520).

The DIF enabled compression hardware 155 then determines if the calculated CRC matches the CRC extracted from DIF #1 (block 525). In response to a determination that at least one of the calculated CRCs does not match a respective CRC contained in the respective DIF #1 (a determination of NO at block 525), the read fails (block 535). Optionally, the read IO may be retried. In response to a determination that each calculated CRC on the decompressed data block matches the each respective CRC contained in each respective DIF #1 (a determination of YES at block 525), the decompressed data/DIF #1 are passed to the host (block 530). By using the DIF enabled compression hardware 155 in connection with read operations, it is possible to provide compression integrity verification in connection with read operations, as well as with write operations, to ensure that the data that is provided to the host is the same as the data that the host previously provided to the storage system in connection with a previous write IO operation.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of destaging data of a write Input/Output (IO) operation from global memory of a storage system to backend storage resources of the storage system, comprising:

receiving a write IO operation containing uncompressed data by the storage system;

dividing the uncompressed data into a set of uncompressed data blocks;

adding a respective first Data Integrity Field (DIF) to each respective uncompressed data block of the set of uncompressed data blocks;

saving the uncompressed data blocks and respective first DIF in the global memory of the storage system;

determining that the write IO should be destaged from the global memory to the backend storage resources of the storage system and stored in the backend storage resources of the storage system in compressed form;

compressing the set of uncompressed data blocks and each respective first DIF to create compressed data;

dividing the compressed data into a set of compressed data blocks;

adding a respective second DIF to each respective compressed data block of the set of compressed data blocks; and verifying that the compressed data is able to be accurately decompressed to recreate the uncompressed data prior to transferring the compressed data blocks and respective second DIF to the backend storage resources, by:

decompressing a copy of the compressed data to create a set of decompressed data blocks, each decompressed data block containing decompressed data and having a respective decompressed first DIF; and using the respective decompressed first DIF to verify the decompressed data contained in each of the respective decompressed data blocks; and after verifying that the compressed data is able to be accurately decompressed to recreate the uncompressed data, transferring the compressed data blocks with respective second DIF to the backend storage resources of the storage system to complete the destage process of the write IO operation.

2. The method of claim 1, wherein compressing the set of data blocks and respective first DIF comprises collectively compressing the set of data blocks and respective first DIF to form the compressed data.

3. The method of claim 1, wherein each uncompressed data block has a size of 512 bytes, each respective first DIF has a size of 8 bytes, each compressed data block has a size of 512 bytes, and each respective second DIF has a size of 8 bytes.

4. The method of claim 3, wherein each respective first DIF includes a respective first Cyclic Redundancy Check (CRC) calculated on a respective 512-byte uncompressed data block, and wherein each respective second DIF includes a respective second CRC calculated on a respective 512-byte compressed data block.

5. The method of claim 4, wherein using the respective decompressed first DIF to verify the decompressed data contained in each of the decompressed data blocks comprises, for each decompressed data block, calculating a third respective CRC on the data contained in the decompressed data block and comparing the third respective CRC with the CRC of the respective first DIF.

6. The method of claim 1, further comprising, in response to a determination that the compressed data is not able to be accurately decompressed to recreate the uncompressed data, implementing a byte-by-byte comparison process to implement compression verification.

7. The method of claim 6, wherein the byte-by-byte comparison process comprises comparing each byte of the decompressed data with each byte of the uncompressed data received in the write IO.

8. The method of claim 1, wherein compressing the set of uncompressed data blocks and respective first DIF to create the compressed data, dividing the compressed data into the set of compressed data blocks, adding the respective second DIF to each respective compressed data block, and verifying the compressed data is able to be accurately decompressed to recreate the uncompressed data, is all implemented in DIF-enabled compression/decompression hardware.

9. A system for destaging data of a write Input/Output (IO) operation from global memory of a storage system to backend storage resources of the storage system, comprising:

one or more processors and one or more storage devices storing instructions that are operable, when executed by the one or more processors, to cause the one or more processors to perform operations comprising:

receiving a write IO operation containing uncompressed data by the storage system;

dividing the uncompressed data into a set of uncompressed data blocks;

adding a respective first Data Integrity Field (DIF) to each respective uncompressed data block of the set of uncompressed data blocks;

saving the uncompressed data blocks and respective first DIF in the global memory of the storage system;

determining that the write IO should be destaged from the global memory to the backend storage resources of the storage system and stored in the backend storage resources of the storage system in compressed form;

compressing the set of uncompressed data blocks and respective first DIF to create compressed data;

dividing the compressed data into a set of compressed data blocks;

adding a respective second DIF to each respective compressed data block of the set of compressed data blocks; and verifying that the compressed data is able to be accurately decompressed to recreate the uncompressed data prior to transferring the compressed data blocks and respective second DIF to the backend storage resources, by:

decompressing a copy of the compressed data to create a set of decompressed data blocks each decompressed data block containing decompressed data and having a respective decompressed first DIF; and using the respective decompressed first DIF to verify the decompressed data contained in each of the respective decompressed data blocks; and after verifying that the compressed data is able to be accurately decompressed to recreate the uncompressed data, transferring the compressed data blocks with respective second DIF to the backend storage resources of the storage system to complete the destage process of the write IO operation.

10. The system of claim 9, wherein compressing the set of data blocks and respective first DIF comprises collectively compressing the set of data blocks and respective first DIF to form the compressed data.

11. The system of claim 9, wherein each uncompressed data block has a size of 512 bytes, each respective first DIF has a size of 8 bytes, each compressed data block has a size of 512 bytes, and each respective second DIF has a size of 8 bytes.

12. The system of claim 11, wherein each respective first DIF includes a respective first Cyclic Redundancy Check (CRC) calculated on a respective 512-byte uncompressed data block, and wherein each respective second DIF includes a respective second CRC calculated on a respective 512-byte compressed data block.

13. The system of claim 12, wherein using the respective decompressed first DIF to verify the decompressed data contained in each of the decompressed data blocks comprises, for each decompressed data block, calculating a third respective CRC on the data contained in the decompressed data block and comparing the third respective CRC with the CRC of the respective first DIF.

14. The system of claim 9, further comprising, in response to a determination that the compressed data is not able to be accurately decompressed to recreate the uncompressed data, implementing a byte-by-byte comparison process to implement compression verification.

15. The system of claim 14, wherein the byte-by-byte comparison process comprises comparing each byte of the decompressed data with each byte of the uncompressed data received in the write IO.

16. The system of claim 9, wherein at least some of the processors are included in Data Integrity Field (DIF) enabled compression/decompression hardware, and wherein the operations of compressing the set of uncompressed data blocks and respective first DIF to create the compressed data, dividing the compressed data into the set of compressed data blocks, adding the respective second DIF to each respective compressed data block, and verifying the compressed data is able to be accurately decompressed to recreate the uncompressed data, are all implemented in the DIF-enabled compression/decompression hardware.

* * * * *